US010387636B2

(12) United States Patent
Matsuura et al.

(10) Patent No.: US 10,387,636 B2
(45) Date of Patent: Aug. 20, 2019

(54) SECURE UNLOCK OF A DEVICE

(71) Applicant: Vivint, Inc., Provo, UT (US)

(72) Inventors: Craig Matsuura, Draper, UT (US);
Ryan Carlson, South Jordan, UT (US);
Johny Bui, Lehi, UT (US); John Rigby, Lehi, UT (US); Bruce Vernon, Cottonwood, UT (US)

(73) Assignee: Vivint, Inc., Provo, UT (US)

( * ) Notice: Subject to any disclaimer, the term of this patent is extended or adjusted under 35 U.S.C. 154(b) by 136 days.

(21) Appl. No.: 14/887,768

(22) Filed: Oct. 20, 2015

(65) Prior Publication Data

US 2017/0109518 A1    Apr. 20, 2017

(51) Int. Cl.
*H04L 29/06* (2006.01)
*G06F 21/34* (2013.01)

(52) U.S. Cl.
CPC .................... *G06F 21/34* (2013.01)

(58) Field of Classification Search
CPC .............................. G06F 21/44; G06F 21/6218
USPC ............................................................ 726/19
See application file for complete search history.

(56) References Cited

U.S. PATENT DOCUMENTS

| | | | |
|---|---|---|---|
| 5,774,059 A * | 6/1998 | Henry | E05B 43/005 235/380 |
| 6,508,397 B1 * | 1/2003 | Do | G07F 19/20 235/379 |
| 7,391,319 B1 | 6/2008 | Walker | |
| 8,311,513 B1 * | 11/2012 | Nasserbakht | G06Q 10/109 455/410 |
| 8,392,702 B2 * | 3/2013 | Qiu | H04L 63/0442 380/277 |
| 8,484,665 B2 * | 7/2013 | McKelvey | G05B 19/054 709/217 |
| 8,612,634 B2 * | 12/2013 | Kweon | H04L 12/282 710/5 |

(Continued)

FOREIGN PATENT DOCUMENTS

GB    2453981    4/2009

OTHER PUBLICATIONS

Barix, 'Universal network-enabled automation interface for home automation, commercial control, and monitoring applications', Barix Inc., Apr. 7, 2016, entire document, http://www.barix.com/fileadmin/data/Manuals/Barionet_Family_Product_manual_201604.pdf.*

(Continued)

*Primary Examiner* — Jahangir Kabir
*Assistant Examiner* — Ronald Baum
(74) *Attorney, Agent, or Firm* — Holland & Hart LLP

(57) ABSTRACT

A control panel may prevent access to one or more aspects of the control panel based at least in part on one or more security parameters. The security parameters may include a default locked status and a takeover locked status. The default locked status may prevent a user or other personnel from accessing the software, code, or other intellectual property on the control panel while still allowing the user to interface with the security and/or automation system. The takeover locked status may prevent any access or use of the control panel. To protect the automation system and the automation system provider, it may be desired to use a unique identifier to unlock at least one or more aspects of the control panel. The unique identifier may be loaded onto an external storage device which the control panel may automatically recognize.

13 Claims, 9 Drawing Sheets

(56) References Cited

U.S. PATENT DOCUMENTS

| | | | | |
|---|---|---|---|---|
| 9,092,962 | B1* | 7/2015 | Merrill | G08B 25/004 |
| 9,207,659 | B1* | 12/2015 | Sami | G05B 15/02 |
| 9,325,516 | B2* | 4/2016 | Pera | H04L 12/2803 |
| 9,547,963 | B1* | 1/2017 | Trundle | G08B 25/08 |
| 2003/0149854 | A1* | 8/2003 | Yoshino | G06F 12/1458 |
| | | | | 711/173 |
| 2003/0220876 | A1* | 11/2003 | Burger | G06F 21/32 |
| | | | | 705/50 |
| 2004/0093516 | A1* | 5/2004 | Hornbeek | H04L 63/10 |
| | | | | 726/7 |
| 2004/0123113 | A1* | 6/2004 | Mathiassen | B60R 25/252 |
| | | | | 713/185 |
| 2004/0215750 | A1* | 10/2004 | Stilp | G06K 7/0008 |
| | | | | 709/220 |
| 2004/0221169 | A1* | 11/2004 | Lee | G06F 21/123 |
| | | | | 713/193 |
| 2005/0182973 | A1* | 8/2005 | Funahashi | G06F 21/34 |
| | | | | 726/19 |
| 2005/0222933 | A1* | 10/2005 | Wesby | G06Q 40/00 |
| | | | | 705/36 R |
| 2005/0285716 | A1* | 12/2005 | Denison | G06F 21/6209 |
| | | | | 340/5.2 |
| 2006/0026672 | A1* | 2/2006 | Braun | G05B 19/042 |
| | | | | 726/9 |
| 2006/0259500 | A1* | 11/2006 | Hood | G05B 19/056 |
| 2007/0079355 | A1* | 4/2007 | Chand | G05B 19/054 |
| | | | | 726/2 |
| 2007/0180509 | A1* | 8/2007 | Swartz | G06F 9/4406 |
| | | | | 726/9 |
| 2007/0250920 | A1* | 10/2007 | Lindsay | G06F 21/31 |
| | | | | 726/7 |
| 2007/0288689 | A1* | 12/2007 | Lu | G06F 21/34 |
| | | | | 711/103 |
| 2008/0083018 | A1* | 4/2008 | Prokupets | G06F 21/32 |
| | | | | 726/4 |
| 2008/0181412 | A1* | 7/2008 | Acar | G06F 21/6209 |
| | | | | 380/279 |
| 2008/0215391 | A1* | 9/2008 | Dowling | G06Q 30/0201 |
| | | | | 705/7.29 |
| 2008/0263363 | A1* | 10/2008 | Jueneman | G06F 21/32 |
| | | | | 713/184 |
| 2009/0070861 | A1* | 3/2009 | Jain | G06K 19/07739 |
| | | | | 726/5 |
| 2009/0183254 | A1* | 7/2009 | Franco | G06F 21/34 |
| | | | | 726/17 |
| 2009/0222907 | A1* | 9/2009 | Guichard | G06F 21/6227 |
| | | | | 726/17 |
| 2009/0319782 | A1* | 12/2009 | Lee | G06F 21/34 |
| | | | | 713/156 |
| 2010/0299745 | A1* | 11/2010 | Karppinen | G06Q 20/3552 |
| | | | | 726/18 |
| 2011/0010470 | A1* | 1/2011 | Hulbert | G06F 3/0219 |
| | | | | 710/13 |
| 2011/0224810 | A1* | 9/2011 | Dubois | G05B 15/02 |
| | | | | 700/90 |
| 2011/0314534 | A1* | 12/2011 | James | G06F 21/53 |
| | | | | 726/9 |
| 2012/0198547 | A1* | 8/2012 | Fredette | G06F 8/34 |
| | | | | 726/19 |
| 2014/0025947 | A1* | 1/2014 | Jaber | G06F 21/572 |
| | | | | 713/164 |
| 2014/0068766 | A1 | 3/2014 | Klustaitis et al. | |
| 2014/0082702 | A1* | 3/2014 | Supalla | H04L 63/10 |
| | | | | 726/4 |
| 2014/0223322 | A1 | 8/2014 | Slack et al. | |
| 2014/0292482 | A1 | 10/2014 | Robertson et al. | |
| 2015/0112885 | A1* | 4/2015 | Fadell | G08B 27/00 |
| | | | | 705/330 |
| 2016/0085977 | A1* | 3/2016 | Oh | G06F 8/61 |
| | | | | 726/20 |
| 2016/0099938 | A1* | 4/2016 | Seo | H04L 63/0853 |
| | | | | 713/169 |
| 2016/0249281 | A1* | 8/2016 | Sahni | H04W 48/16 |

OTHER PUBLICATIONS

Karim, R., et al, 'Smart Door Lock', Dec. 1, 2013, School of Information and Communication Technology (ICT) KTH Royal Institute of Technology, entire document, https://people.kth.se/~maguire/DEGREE-PROJECT-REPORTS/131201-Rafid_Karim_and_Haidara_Al-Fakhri-with-cover.pdf.*

* cited by examiner

SECURE UNLOCK OF A DEVICE

BACKGROUND

The present disclosure, for example, relates to security and/or automation systems, and more particularly to unlocking a control panel and/or device using unique information.

Security and automation systems are widely deployed to provide various types of communication and functional features such as monitoring, communication, notification, and/or others. These systems may be capable of supporting communication with a user through a communication connection or a system management action.

In some instances, the control panel may be susceptible to one or more undesirable scenarios. For example, the control panel may experience an unauthorized takeover, unauthorized alterations, inept software, or software with a bug, and the like. A competitor may attempt to reverse engineer the software located within the control panel. The unauthorized takeover may be a competitor attempting to utilize the hardware provided by the current automation system provider. A user may also attempt to make one or more alterations to a control panel. In some embodiments, a larcenist may attempt to install software to illicitly access one or more aspects of the automation system. The control panel may need to protect itself from one or more of these scenarios.

SUMMARY

A control panel may prevent access to one or more aspects of the control panel based at least in part on one or more security parameters. The security parameters may include a default locked status and a takeover locked status. The default locked status may prevent a user or other personnel from accessing portions of the software, code, or other intellectual property on the control panel while still allowing the user to interface with the security and/or automation system. The takeover locked status may prevent any access or use of the control panel. To protect the automation system and the automation system provider, it may be desired to use a unique identifier to unlock at least one or more aspects of the control panel. The unique identifier may be loaded onto an external storage device which the control panel may automatically recognize.

In one embodiment, a method to unlock a device is described. The method may comprise generating a unique identifier and transmitting the unique identifier to a location remote from the device. The method may include locking at least one aspect of the device based at least in part on one or more security parameters and unlocking the at least one aspect the device when the unique identifier is input into the device.

In further embodiments, the method may include determining when an external storage device connects to the device via a universal serial bus connection. The external storage device may be authenticated using an authentication code and then searched for an unique identifier. The method may include opening a profile associated with the unique identifier after unlocking the device. The profile may comprise a provider profile to troubleshoot a problem with the control panel. In alternative embodiments, the profile may comprise a user profile and unlocking the device enables a user to resume regular use of the device.

Authenticating the external storage device may comprise detecting an authentication code on the external storage device and comparing the detected authentication code with an authentication code stored locally on the device. Authenticating the external storage device may further comprise approving the external storage device when the two authentication codes match.

In some embodiments, the method may include alerting an automation system provider of the locking when the device is completely inaccessible, wherein the device is a control panel associated with the automation system provider. The unique identifier may be reset at a predetermined time period. In further embodiments, the unique identifier may expire after a predetermined time period. The device may be a control panel and the unique identifier may only be accessible on an external device authenticated by an automation system provider associated with the control panel. The external device may be a universal serial bus (USB) drive and the external device may connect to a USB port on the device.

In some embodiments, a device for an automation system is disclosed. The device may comprise a processor, memory in electronic communication with the processor; and instructions stored in the memory. The instructions may be executable by the processor to generate a unique identifier and transmit the unique identifier to a location remote from the device. The instructions may be further executable by the processor to lock at least one aspect the device based at least in part on one or more security parameters and unlock the at least one aspect of the device when the unique identifier is input into the device.

In further embodiments, a non-transitory computer-readable medium storing computer-executable code for security and/or automation systems is disclosed. The code may be executable by a processor to generate a unique identifier and transmit the unique identifier to a location remote from the device. The code may be further executable to lock at least one aspect of the device based at least in part on one or more security parameters and unlock the at least one aspect of the device when the unique identifier is input into the device The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the descrip

DETAILED DESCRIPTION

A control panel may have several locked states. The default locked state may allow a user to access a user interface of the control panel and the subsequent and/or related features of the security and automation system. However, the default locked state may inhibit access to portions of the code, services, and other features of the control panel. In another embodiment, the control panel may have a takeover locked stated. The control panel may lock in response to one or more hostile scenarios. For example, the control panel may lock in response to an unauthorized takeover, unauthorized alterations, inept software, or software with a bug, and the like.

To update and/or alter the locked portions of the control panel or to resume normal use after a takeover locked state, the control panel may need to be unlocked. To prevent unauthorized personnel from unlocking the panel, and to protect the automation system and the automation system provider, a unique information may be required to access locked portions of the control panel. The unique information may be one of several types of unique identifiers. In some embodiments, the unique identifier may be unique to the control panel. For example, each control panel may recognize a self-generated unique identifier. In another embodiment, the control panel may respond to one or more unique identifiers generated by an automation system provider. In another embodiment, the unique information may comprise a unique employee identification number, pin number, challenge question/response, and the like.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
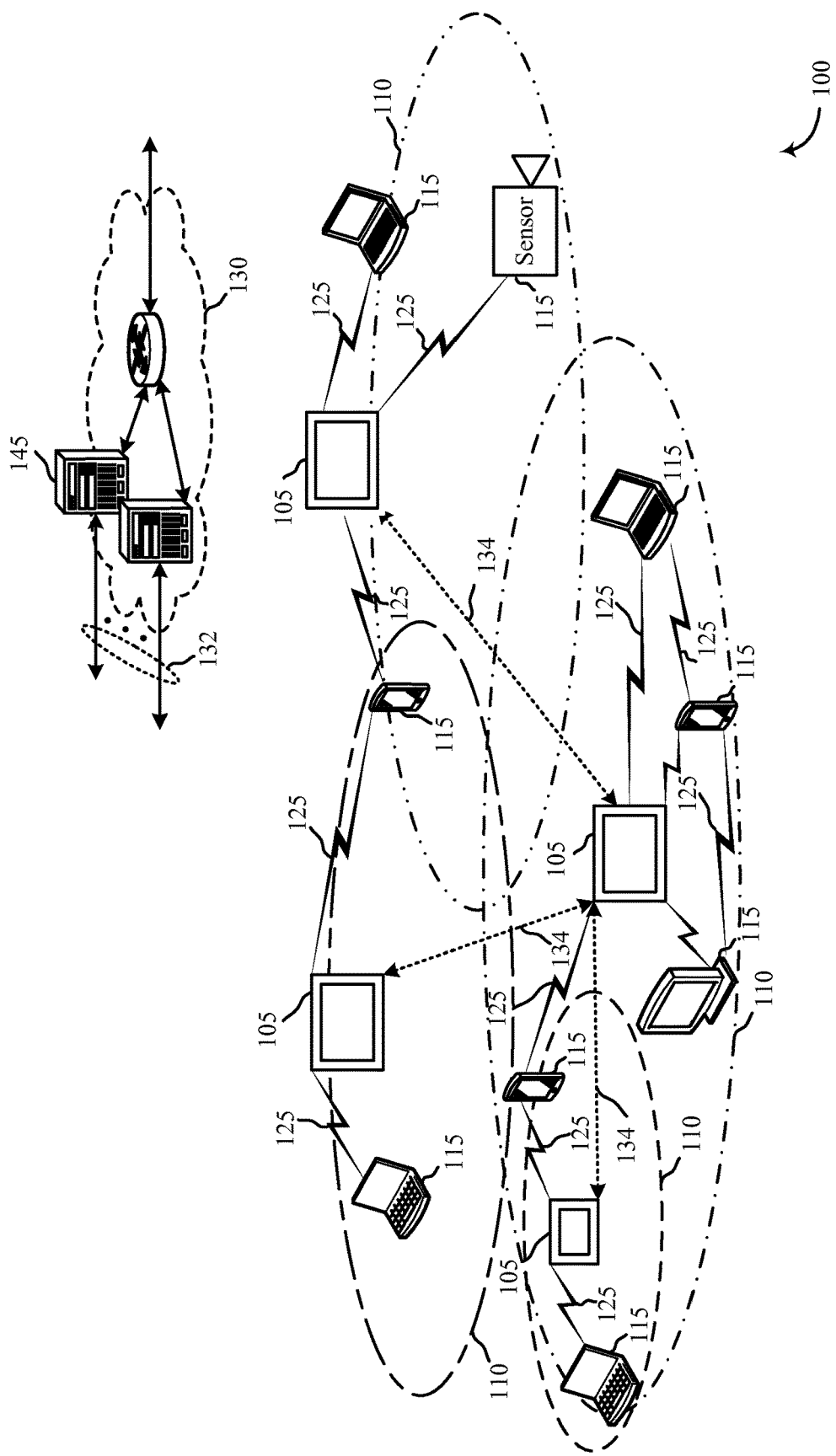
- FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 and may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, a universal serial bus (USB) external storage device, and/or the like. A device 115 may also include or be referred to by those skilled in the art as a user device, a sensor, an external storage device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, an external storage device, and/or some other suitable terminology. A device 115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. The device 115 may be a camera used to detect and record motion. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 125. Two or more devices 115 may communicate via a direct communication link 125 when both devices 115 are in the geographic coverage area 110 or when one or neither devices 115 is within the geographic coverage area 110. Examples of direct communication links 125 may include Wi-Fi Direct, Bluetooth, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.1 lad, 802.11ah, etc. In other implementations, other peer-to-peer connections and/or ad hoc networks may be implemented within communications system 100.

In some embodiments, the control panel 105 may communicate one or more unique identifiers to a remote server 145 and/or storage device through one or more communication links 132. The remote server 145 and/or storage device may retain the unique identifier. The control panel 105 may include a default locked state or a takeover locked state. In a default locked state, the user may utilize the control panel 105 to operate the security and/or automation system but not access the code or other internal software unique to the control panel 105. In a takeover locked state, the control panel 105 may lock in response to one or more security parameters. The security parameters may include a hostile takeover of the control panel 105, an unauthorized attempt to reformat or reconfigure the control panel 105 by altering the software, hardware or both, and the like. The control panel 105 may communicate its takeover locked status to the remote server via the communication links 132. In another embodiment, the control panel 105 may require service and an automation system personnel may need to access the default locked state of the control panel 105. The external storage device 115 may retrieve the unique identifier from the remote server 145 and directly connect to the control panel 105 to unlock the control panel 105. This may be performed by authorized personnel associated with an automation system provider.

In another embodiment, the unique identifier may comprise a response answer to a challenge question. For example, if the control panel 105 is offline and not connected to a remote server 145, the control panel 105 may receive a request to unlock one or more portions of the control panel 105. The control panel 105 may validate the request by presenting a challenge question to the requestor and the requestor may need to enter a response. If the response is an exact match, the control panel 105 may unlock. The control panel 105 may additionally unlock if the response substantially matches. For example, the response may not need to be case specific or may not need correct punctuation or dashes if the response is a number.

Figure 2:
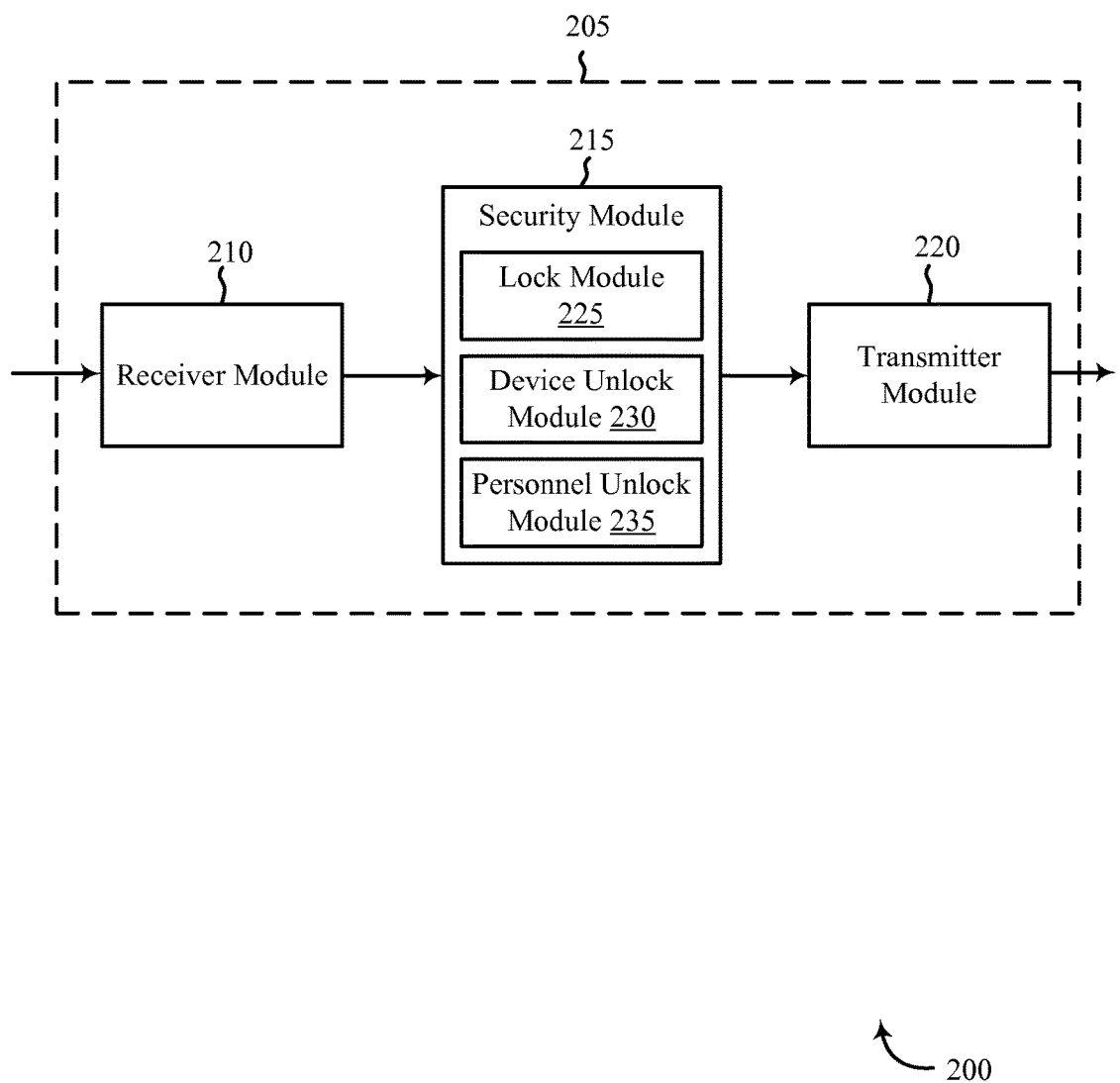
FIG. 2 shows a block diagram of a device relating to a security and/or an automation system, in accordance with various aspects of this disclosure.

FIG. 2 shows a block diagram 200 of a control panel 205 for use in security reactions, in accordance with various aspects of this disclosure. The control panel 205 may be an example of one or more aspects of a control panel 105 described with reference to FIG. 1. The control panel 205 may include a receiver module 210, a security module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more inputs of attempted tampering or altering of the control panel 205 and/or one or more inputs of potentially harmful software. Information may be passed on to the security module 215, and to other components of the control panel 205.

The security module 215 may protect one or more portions of the control panel 205. The security module 215 may include a lock module 225 a device unlock module 230, and a personnel unlock module 235. The security module 215 may have a default locked status of the control panel 205 controlled by the lock module 225.

The lock module 225 may maintain two different locked states. The lock module 225 may maintain a default locked status and a takeover locked statuses. The default locked status may prevent a user or other personnel from accessing the software and/or code and other intellectual property associated with the control panel 205-*a* while still allowing the user to interface with and control the security and/or automation system. The lock module 225 may maintain the default locked status and disallow any attempts to access the software.

If there is an attempt to view, access, or alter the software and/or code, the lock module 225 may enter a takeover locked status. In the takeover locked status, the user may be unable to access any portion of the control panel 205-*a*. The lock module 225 may lock all aspects of the control panel 205-*a* in response to one or more security events. For example, if a user or other personnel attempt to access and reprogram the control panel 205-*a*, the control panel 205-*a* may default and enter a takeover lock status preventing access to the system. In some instances, this may occur when a competitor attempts to overtake the system. It may also occur if a user is attempting to further program the control panel 205-*a* to change an aspect of the automation system. In another instance, a person may gain unauthorized access to the automation system and may attempt to override or otherwise hack into the control panel 205-*a* to gain unauthorized access to at least a portion of the automation system. Additionally, the lock module 225 may automatically enter the default and/or takeover locked status when the control panel 205-*a* is reformatted.

The device unlock module 230 and/or the personnel unlock module 235 may unlock the control panel 205 from a takeover locked state or to access the default locked state of the control panel 205. The device unlock module 230 may utilize a specific code to unlock the control panel 205. The specific code may be a numeric code, an alpha code, an alphanumeric code, a series of codes, or some combination thereof. The code may be generated by the security module 215 and stored at a location remote to the control panel 205. The personnel unlock module 235 may utilize a personnel identification number and/or an offline mode to unlock the control panel.

The transmitter module 220 may transmit the one or more signals received from other components of the control panel 205. The transmitter module 220 may transmit the security code to one or more locations remote from the control panel 205. The transmitter module 220 may additionally transmit one or more alerts of a locked control panel 205 to a remote server or other venue associated with the automation system. In some examples the transmitter module 220 may be collocated with the receiver module 210 in a transceiver module.

Figure 3:
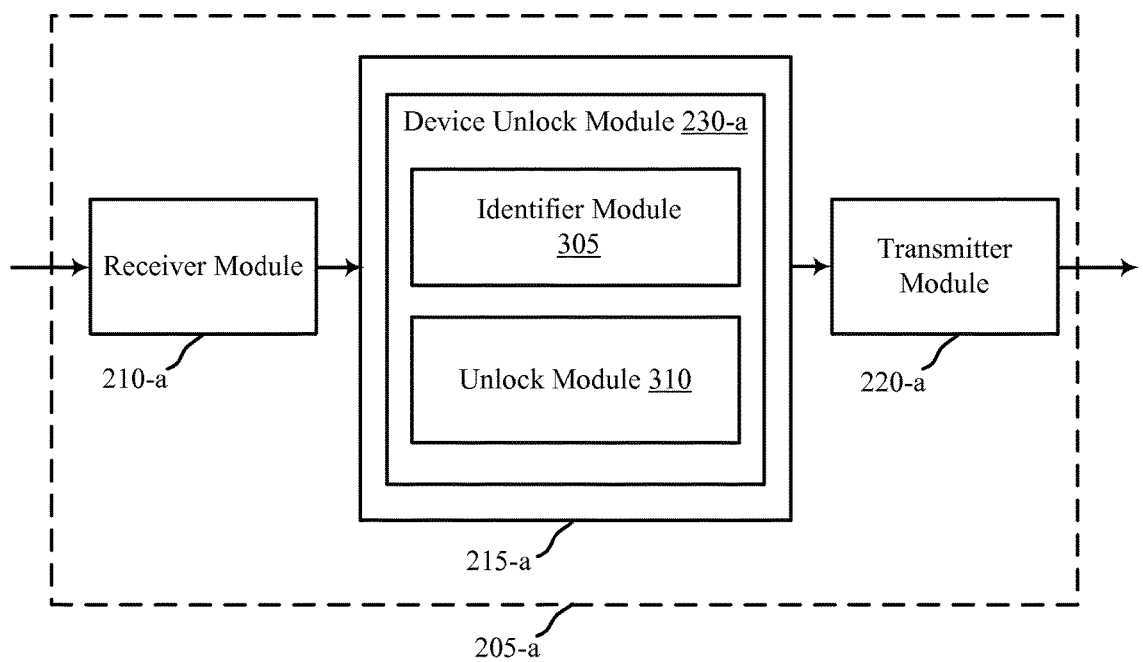
FIG. 3 shows a block diagram of a device relating to a security and/or an automation system, in accordance with various aspects of this disclosure.

FIG. 3 shows a block diagram 300 of a control panel 205-*a* for use in security systems, in accordance with various examples. The control panel 205-*a* may be an example of one or more aspects of a control panel 105 described with reference to FIG. 1. It may also be an example of a control panel 205 described with reference to FIG. 2. The control panel 205-*a* may include a receiver module 210-*a*, a security module 215-*a*, a device unlock module 230-*a* and/or a transmitter module 220-*a*, which may be examples of the corresponding modules of control panel 205 with reference to FIG. 2. The control panel 205-*a* may also include a processor. Each of these components may be in communication with each other. The device unlock module 230-*a* may include an identifier module 305 and an unlock module 310. The receiver module 210-*a* and the transmitter module 220-*a* may perform the functions of the receiver module 210 and the transmitter module 220, of FIG. 2, respectively.

The identifier module 305 may generate one or more unique identifiers to securely access the control panel. The unique identifier may be one of several types of identifiers. For example, the unique identifier may be a biometric identifier responding to a person's voice or fingerprint, it may be a randomly generated number of a predetermined length, it may be a series of codes to be input in a specific manner, it may be an alphanumeric number, or the like.

In some embodiments, the unique identifier may be unique to the control panel 205-*a*. For example, each control panel may generate a unique identifier which it may transfer to a server associated with the automation system. In some embodiments, the unique identifier may be generated when the control panel is first programmed. In other embodiments, the unique identifier may additionally or alternatively be generated on a random or predetermined basis. For example, every month, bi-monthly, bi-annually, or annually, the unique identifier may be regenerated. In some embodiments, regenerating the unique identifier may offer additional security to prevent unauthorized access or tampering with the control panel.

In some embodiments, the unique identifier may allow a user to select the level of access to the control panel 205-*a* or other device. The unique identifier may be linked to one or more profiles on a control panel. Varying levels of access may be granted for each profile. Generating different identifiers for different profiles may ensure the correct personal unlocks the control panel 205-*a* with the appropriate access level.

The unlock module 310 may allow authorized personnel with access to the security code to unlock the control panel from either the default locked state or the takeover locked state and allow one or more personnel to unlock and access the functions of the control panel. The unlock module 310 may recognize the unique identifier as it is entered into one or more tactile inputs on the control panel 205-*a*. In other embodiments, the control panel 205-*a* may be situated to receive input from a secondary device or an external storage device 115, such as one of the devices 115 described with reference to FIG. 1. For example, the control panel 205-*a* may have one or more input capabilities. The input capabilities may comprise a universal serial bus (USB) drive, a high definition multi-media interface (HDMI) input, thunderbolt input, firewire, Ethernet, or other wired inputs. The wired inputs may accept a wire which may connect the control panel to an external device. The unlock module 310 may automatically read information on the external device connected to the control panel. In some embodiments, the control panel may uniquely read the unique identifier on the external device.

The unlock module 310 may allow the control panel 205-*a* to completely unlock and allow personnel to access the software and/or code and other intellectual property internal to the control panel 205-*a*. In another embodiment, the unlock module 310 may unlock the takeover locked mode and allow a user to access the normal functions of the control panel 205-*a*.

Figure 4:
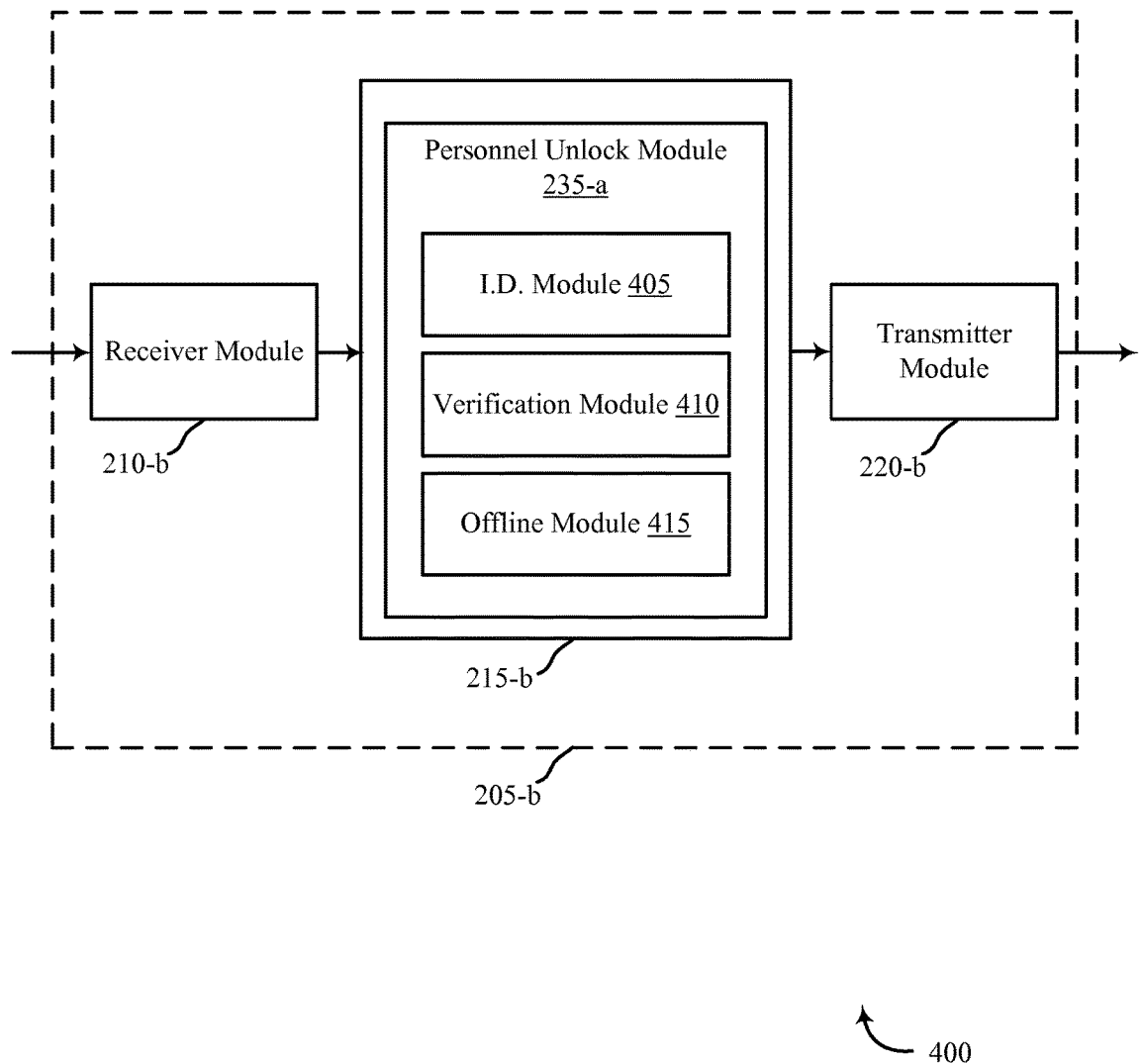
FIG. 4 shows a block diagram of a device relating to a security and/or an automation system, in accordance with various aspects of this disclosure.

FIG. 4 shows a block diagram 400 of a control panel 205-*b* for use in security systems, in accordance with various examples. The control panel 205-*b* may be an example of one or more aspects of a control panel 105 described with reference to FIG. 1. It may also be an example of a control panel 205 described with reference to FIGS. 2 and/or 3. The control panel 205-*b* may include a receiver module 210-*b*, a security module 215-*b*, a personnel unlock module 235-*a*, and/or a transmitter module 220-*b*, which may be examples of the corresponding modules of control panel 205 with reference to FIGS. 2 and/or 3. The control panel 205-*b* may also include a processor. Each of these components may be in communication with each other. The personnel unlock module 235-*a* may include an I.D. module 405, a verification module 410, and an offline module 415. The modules may additionally work in addition to and/or in conjunction with the modules in FIG. 3. The receiver module 210-*b* and the transmitter module 220-*b* may perform the functions of the receiver module 210 and the transmitter module 220, of FIGS. 2 and/or 3, respectively.

The I.D. module 405 may store employee's identification numbers associated with a security profile. The employee identification numbers may comprise an actual number, a QR code, an alpha-numeric code, or the like. The employee identification number may be unique for each technician. Each employee may be granted access to a portion of a control panel. Some employees may have access to locked portions of the control panel 205-*b*. The locked portions may prevent access to the software and internal workings of the control panel 205-*b* or may completely prevent the normal operation of the control panel. If the automation system requires updating, or if the control panel 205-*b* requires any maintenance or updating, an employee may require unfettered access to the entirety of the control panel 205-*b*. Therefore, the I.D. module 405 may store employee's identification numbers which provide access to the control panel 205-*b*. The I.D. module 405 may store a listing of identification numbers along with access information and job statuses. For example, a service employee may be listed to work on specific control panels for the day which may be connected to their profile in the I.D. module. The job information may comprise a list of access requirements as well as expected service parameters, if any. Expected service parameters may include replacing devices (e.g. devices 115), adding new devices, troubleshooting one or more aspects of the system, and the like.

The verification module 410 may verify employee information and take one or more actions based at least in part on the verification. The employee may enter their identification number at a control panel 205-*b*. Entering the number may include scanning a code or manually entering a code into a user interface proximate the control panel 205-*b*. The control panel 205-*b* may communicate the identification number back to the verification module 410. The verification module 410 may be proximate the control panel 205-*b* or, in some embodiments, may be executed on a remote server. The verification module 410 may review the identification number and determine if the number is associated with a valid employee. If the number is associated with a valid employee, the verification module 410 may review the access parameters of the employee and whether the control panel 205-*b* is included within the employee's listing of actions for the day. If the access parameters are valid and the control panel is listed, the employee may be granted access to any and/or all locked portions of the control panel 205-*b*. If the control panel 205-*b* is not listed on the current listing of jobs, further verification may be required. If the employee identification number is verified and access is granted, the verification module 410 may track any changes and alterations to the control panel 205-*b*. This may validate inventory tracking. The request to access the control panel 205-*b* may additionally be logged for later review.

The offline module 415 may unlock one or more aspects of the control panel 205-*b* if the control panel 205-*b* is not connected to the network. The offline module 415 may generate and store a challenge question and a response answer locally on the control panel 205-*b* and remotely store the challenge question and the response answer on a server associated with the automation system. The technician may enter in a command or other key for off-line authorization. Additionally, the control panel 205-*b* may prompt the technician to begin the off-line process. The control panel 205-*b* may present a challenge to the technician and prompt the technician to enter in a response to the challenge in order to unlock one or more aspects of the control panel 205-*b*. The response may comprise a series of responses. For example, the response may comprise a specific code, a graphic code such as a QR code, or a word response. When a satisfactory answer is entered, the control panel 205-*b* may unlock. The service technician may retrieve the response prior to departing for the service run if the technician is aware that the control panel 205-*b* is offline. Additionally, the service technician may use other means of retrieving the response. This may include connecting to the remote server and entering in the control panel code or identification number to retrieve the response. The technician may also call one or more personnel associated with the automation system to retrieve the response.

Figure 5:
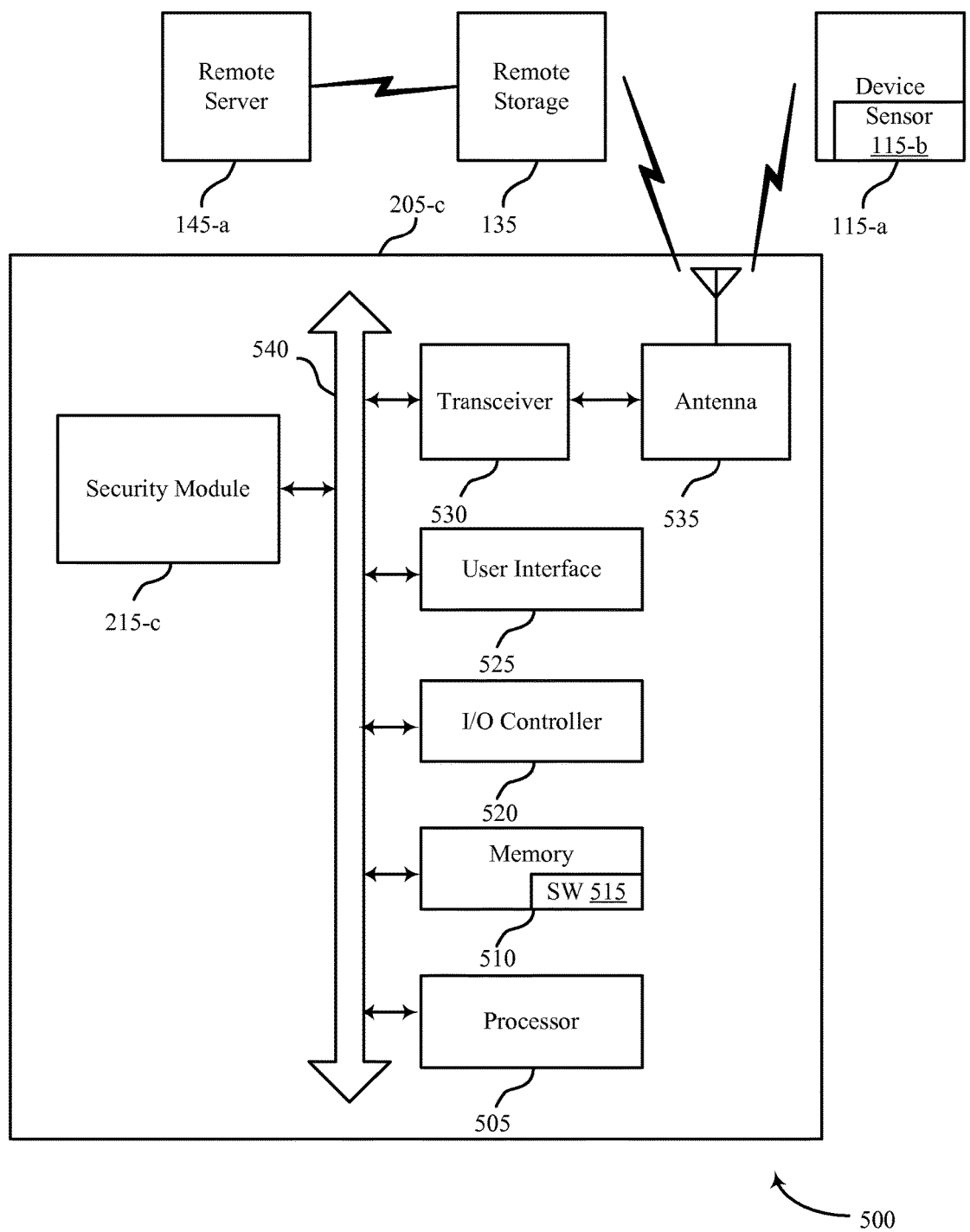
FIG. 5 shows a block diagram relating to a security and/or an automation system, in accordance with various aspects of this disclosure.

FIG. 5 shows a system 500 for use in unlocking a control panel for use in a security and automation system, in accordance with various examples. System 500 may include a control panel 205-*c*, which may be an example of the control panels 105 of FIG. 1. The control panel 205-*c* may also be an example of one or more aspects of control panels 205 and/or 205-*a* of FIGS. 2 and 3. The control panel 205-*c* may include a security module 215-*c*, which may be an example of the security module 215 described with reference to FIGS. 2 and 3. In some embodiments, the terms a control panel and a control device are used synonymously.

The control panel 205-*c* may also include components for bi-directional voice and data communications including components for transmitting communications and components for receiving communications. For example control panel 205-*c* may communicate bi-directionally with one or more of device 115-*a*, one or more sensors 115-*b*, remote storage 135, and/or remote server 145-*a*, which may be an example of the remote server illustrated in FIG. 1. This bi-directional communication may be direct (e.g., control panel 205-*c* communicating directly with remote storage 135) or indirect (e.g., control panel 205-*c* communicating indirectly with remote server 145-*a* through remote storage 135).

The security module 215-*c* may maintain the security and integrity of the control panel 205-*c*. The security module 215-*c* may maintain a default locked state and a takeover locked state. The two differing locked states may protect the control panel 205-*c* from hostile takeover by a competitor, prevent reverse engineering or altering of the control panel 205-*c*, and the like. The security module 215-*c* may allow personnel to access the default locked state of the control panel 205-*c* and/or unlock the control panel 205-*c* from a takeover locked state. The security module 215-*a* may additionally recognize when authorized personnel are attempting to service portions of the control panel 205-*c*. The security module 215-*a* may allow the authorized personnel access to all aspects of the control panel 205-*c* including those associated with the default locked status.

The control panel 205-*c* may also include a processor module 505, and memory 510 (including software (SW)

515), an input/output controller module 520, a user interface module 525, a transceiver module 530, and one or more antennas 535 each of which may communicate—directly or indirectly—with one another (e.g., via one or more buses 540). The transceiver module 530 may communicate bi-directionally—via the one or more antennas 535, wired links, and/or wireless links—with one or more networks or remote devices as described above. For example, the transceiver module 530 may communicate bi-directionally with one or more of device 115-a, remote storage 135, and/or remote server 145-a. The transceiver module 530 may include a modem to modulate the packets and provide the modulated packets to the one or more antennas 535 for transmission, and to demodulate packets received from the one or more antenna 535. While a control panel or a control device (e.g., 205-c) may include a single antenna 535, the control panel or the control device may also have multiple antennas 535 capable of concurrently transmitting or receiving multiple wired and/or wireless transmissions. In some embodiments, one element of control panel 205-c (e.g., one or more antennas 535, transceiver module 530, etc.) may provide a direct connection to a remote server 145-a via a direct network link to the Internet via a POP (point of presence). In some embodiments, one element of control panel 205-c (e.g., one or more antennas 535, transceiver module 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 535 and/or transceiver module 530 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 535 may receive signals or information specific and/or exclusive to itself. In other embodiments each antenna 535 may receive signals or information not specific nor exclusive to itself.

In some embodiments, one or more sensors 115-b (e.g., motion, proximity sensor, smoke, glass break, door, window, carbon monoxide, and/or another sensor) may connect to some element of system 500 via a network using one or more wired and/or wireless connections.

In some embodiments, the user interface module 525 may include an audio device, such as an external speaker system, an external display device such as a display screen, and/or an input device (e.g., remote control device interfaced with the user interface module 525 directly and/or through I/O controller module 520). An example of a remote control device may be an external storage device that may be connected to the control panel 205-c via a universal serial bus (USB) drive, a high definition multi-media interface (HDMI) input, thunderbolt input, firewire, Ethernet, or other wired inputs.

One or more buses 540 may allow data communication between one or more elements of control panel 205-c (e.g., processor module 505, memory 510, I/O controller module 520, user interface module 525, etc.).

The memory 510 may include random access memory (RAM), read only memory (ROM), flash RAM, and/or other types. The memory 510 may store computer-readable, computer-executable software/firmware code 515 including instructions that, when executed, cause the processor module 505 to perform various functions described in this disclosure (e.g., locking the control panel 205-c in response to one or more security events, unlocking one or more locked status of the control panel 205-c, etc.). Alternatively, the software/firmware code 515 may not be directly executable by the processor module 505 but may cause a computer (e.g., when compiled and executed) to perform functions described herein.

In some embodiments the processor module 505 may include, among other things, an intelligent hardware device (e.g., a central processing unit (CPU), a microcontroller, and/or an ASIC, etc.). The memory 510 can contain, among other things, the Basic Input-Output system (BIOS) which may control basic hardware and/or software operation such as the interaction with peripheral components or devices. For example, the security module 215-c to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 530, one or more antennas 535, etc.).

Many other devices and/or subsystems may be connected to one or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller module 520 may be iOS®, ANDROID®, MS-dOS®, MS-WINDOWS®, OS/2®, UNIX®, LINUX®, or another known operating system.

The transceiver module 530 may include a modem configured to modulate the packets and provide the modulated packets to the antennas 535 for transmission and/or to demodulate packets received from the antennas 535. While the devices 115-a may include a single antenna 535, the devices 115-a may have multiple antennas 535 capable of concurrently transmitting and/or receiving multiple wireless transmissions.

Figure 6:
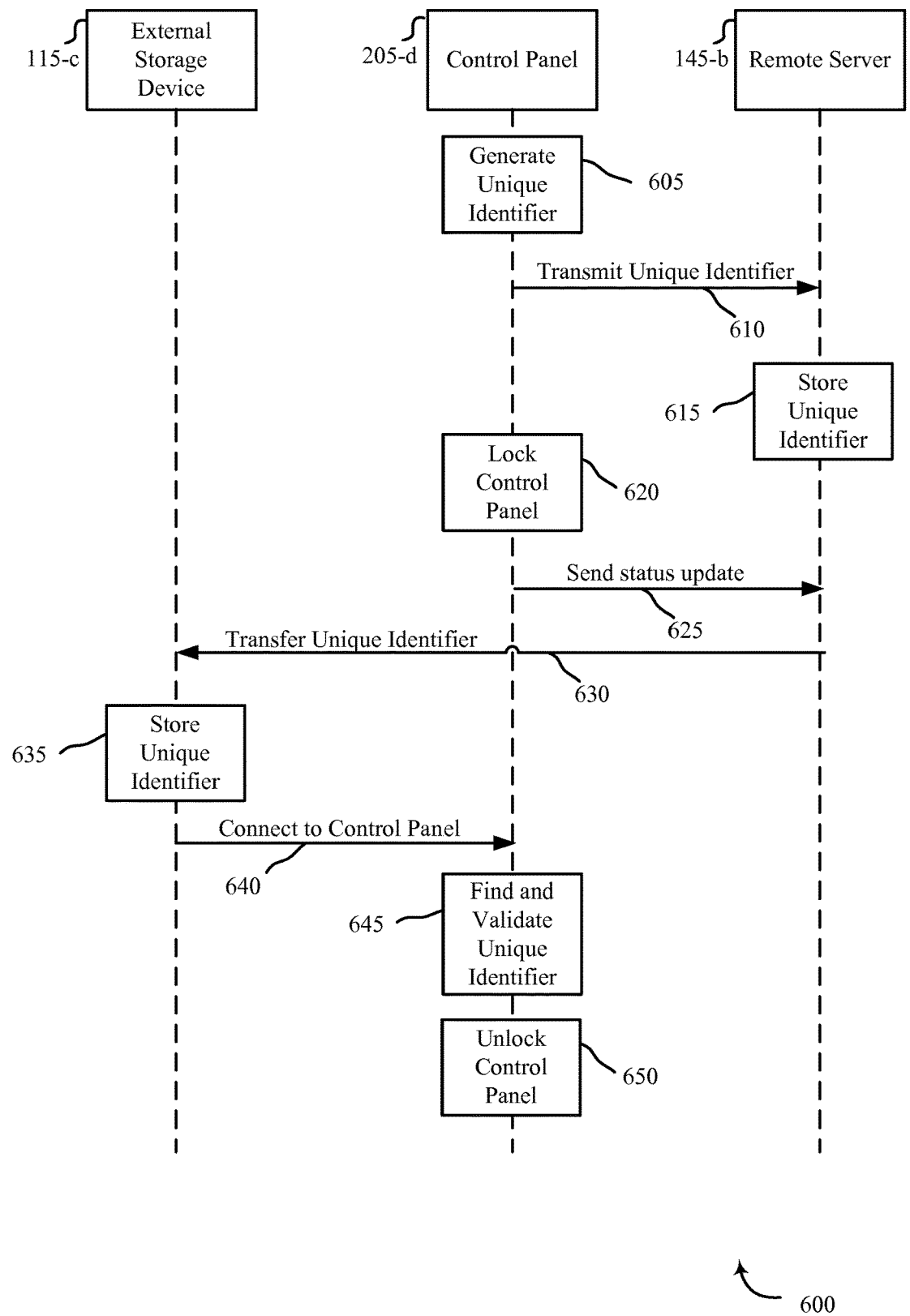
FIG. 6 shows a swim diagram of illustrating a process related to a security and/or an automation system, in accordance with various aspects of this disclosure.

FIG. 6 shows a swim diagram 600 illustrating communications in security systems for a control panel, in accordance with various examples. The diagram 600 may illustrate one or more devices 115-c, which may be an example of the device 115 of FIG. 1. The diagram may also illustrate a control panel 205-d which may an example of control panel 105 of FIG. 1 and/or an example of one or more aspects of control panels 205 and/or 205-a of FIGS. 2 and 3. A remote server 145-b may be one example of the remote server 145 as described with reference to FIGS. 1 and 4.

The control panel 205-*d* may generate one or more unique identifiers 605. The unique identifiers 605 may be generated when the control panel 205-*d* is installed, or may be generated at predetermined times or at pseudorandom times. After the control panel 205-*d* generates the unique identifier 605, the control panel 205-*d* may transfer the unique identifier 610 to the remote server 145-*b*.

The remote server 145-*b* may store the unique identifier 615. The server 145-*b* may have one or more storage mediums (e.g. remote storage database) and may retain the unique identifier in that storage.

The control panel 205-*d* may lock 620 in response to one or more security events. The security events may comprise a bad line of code, a mis-performing software function, an attempt to reformat the control panel 205-*d*, an attempt to reprogram the control panel 205-*d*, or the like. The control panel 205—may send a status update 625 to the server 145-*b*. The status update may comprise one or more pieces of information relating to the security event and the locked status of the control panel 205-*d*.

The remote server 145-*b* may transfer the unique identifier 630 to an external storage device 115-*c*. The remote server 145-*b* may transfer the unique identifier 630 to the external storage device 115-*c* via one of several mediums. The external storage device 115-*c* may plug directly into the remote server 145-*b* via a wired connection, a USB direct connection, a wireless connection, or the like.

The external storage device 115-*c* may store the unique identifier 635 and then connect to the control panel 640. The external storage device 115-*c* may connect to the control panel 205-*d* via a wired connection, or may plug directly into the control panel 205-*d* via a USB connection, or some other means of connection.

Once the external storage device 115-*c* and the control panel 205-*d* are linked, the control panel 205-*d* may find and validate the unique identifier 645. For example, the external storage device 115-*c* may complete one or more circuits when it connects to the control panel 205-*d*. The control panel 205-*d* may recognize the closed circuit and search the external storage device 115-*c* for the unique identifier. Once the unique identifier is located, the control panel 205-*d* may compare the unique identifier to the latest generated unique identifier stored locally on the control panel 205-*d*. If the unique identifiers match, the control panel 205-*d* may unlock 650 one or more locked statuses. For example, the control panel 205-*d* may completely unlock and allow access to all aspects of the control panel 205-*d*. Alternatively, the control panel 205-*d* may unlock from a takeover locked status to a default locked status wherein the user may once again use the control panel 205-*d* to interface with the security and/or automation system.

Figure 7:
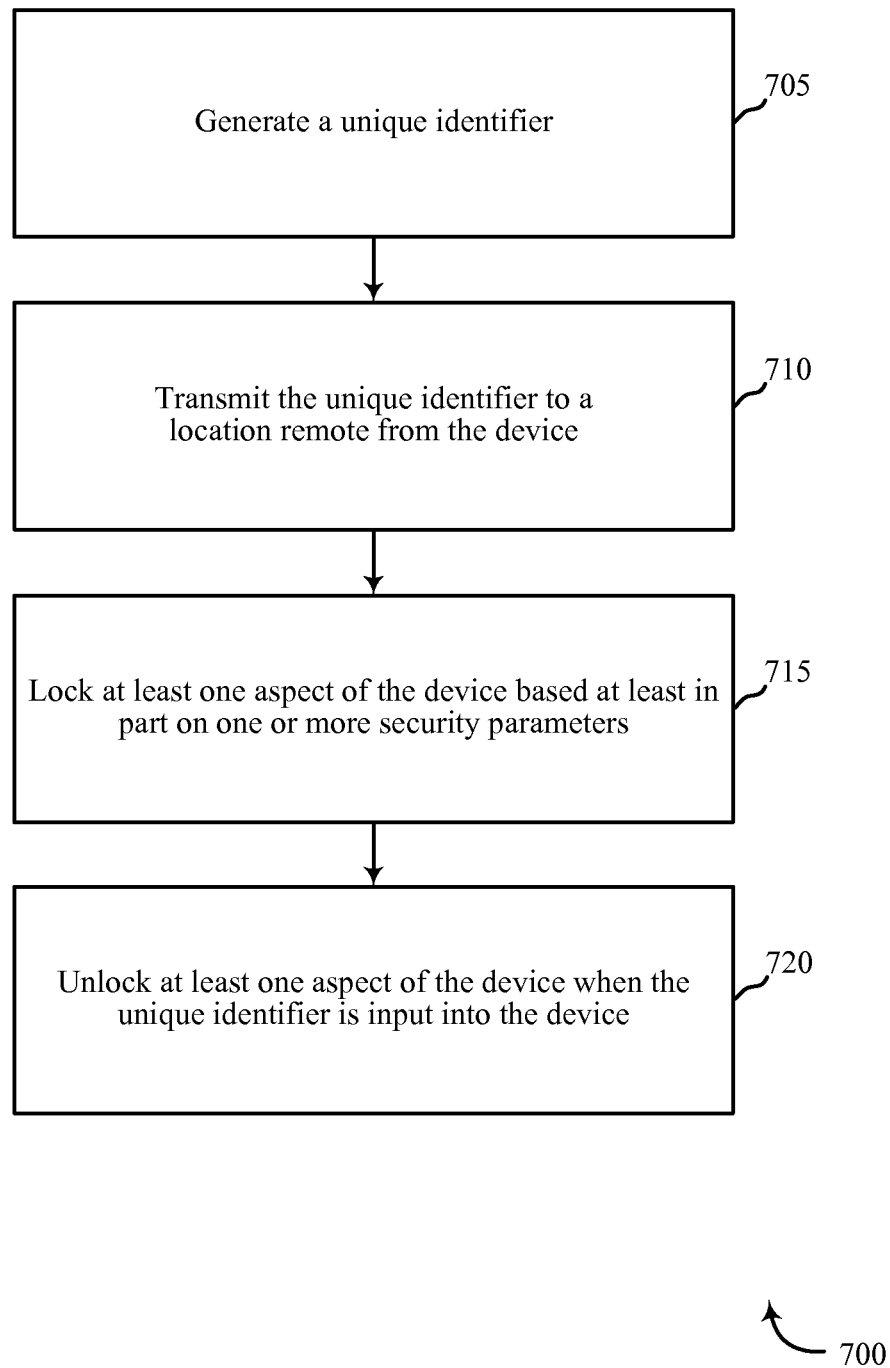
FIG. 7 is a flow chart illustrating an example of a method relating to a security and/or an automation system, in accordance with various aspects of this disclosure.

FIG. 7 is a flow chart illustrating an example of a method 700 for responding to one or more security events at the control panel, in accordance with various aspects of the present disclosure. For clarity, the method 700 is described below with reference to aspects of one or more of the security module 215 described with reference to FIGS. 2, 3, 4, 5 and/or aspects of one or more of the control panel 205 described with reference to FIGS. 1-6. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 705, the method 700 may include generating a unique identifier. The unique identifier may comprise one of several types of unique identifiers. For example, the unique identifier may be a biometric identifier responding to a person's voice or fingerprint, it may be a randomly generated number of a predetermined length, it may be a series of codes to be input in a specific manner similar to a lock, it may be an alphanumeric number, or the like. If the unique identifier comprises a biometric identifier, the control panel may comprise one or more components to selectively detect and evaluate a biometric identifier. In some embodiments, the unique identifier may be unique to the control panel. For example, each control panel may generate a unique identifier which may be located on a server associated with the control panel. In some embodiments, multiple unique identifiers may be generated and later used to unlock the control panel.

In some embodiments, the unique identifier may be generated when the control panel is first programmed. In other embodiments, the unique identifier may additionally or alternatively be generated on a random or predetermined basis. The unique identifier may be regenerated monthly, bi-monthly, bi-annually, annually, or some combination thereof. Providing for random generation of the unique identifier may provide an additional level of security. In some embodiments, regenerating the unique identifier may offer additional security to prevent unauthorized access or tampering with the control panel. In alternative embodiments, a server associated with an automation system provider may generate the unique identifier and transmit the unique identifier to the control panel.

The operation(s) at block 705 may be performed using the identifier module 305 described with reference to FIG. 3.

At block 710, the method 700 may include transmitting the unique identifier to a location remote from the device. In some embodiments, the device may comprise a control panel. For example, the unique identifier may be used to unlock the control panel should the control panel encounter one or more security events. To use the identifier to unlock the control panel, the identifier must be remote from the control panel to be easily accessible. In an automation system, the control panel may transmit the unique identifier to one or more remote servers (e.g. remote server 145) and/or one or more remote storages (e.g. remote storage 135). The control panel may transmit the information via one or more wired or wireless connections as discussed previously.

The operation(s) at block 710 may be performed using the identifier module 305 described with reference to FIG. 3.

At block 715, the method 700 may include locking at least one aspect of the device based at least in part on one or more security parameters. The one or more security parameters may comprise a default locked status or a takeover locked status. The default locked status may allow a user to use the device but not access any of the code or software or other intellectual property on the device. The takeover locked status may completely lock access to the device in response to any unauthorized attempts to edit one or more pieces of hardware and/or software on the device. For example, a user or other personnel may attempt to reprogram a control panel, the control panel may default and lock down preventing access to the system. In some instances, this may occur when a competitor attempts to overtake the system. It may also occur if a user is attempting to further program the control panel to change an aspect of the automation system. In another instance, a person may gain unauthorized access to the automation system and may attempt to override or otherwise hack into the control panel to gain unauthorized access to at least a portion of the automation system. When the control panel is in locked mode, a user may be unable to access the control panel and/or functions of the automation system.

The operation(s) at block 715 may be performed using the lock module 225 described with reference to FIG. 2.

At block 720, the method 700 may comprise unlocking at least one aspect of the device when the unique identifier is input into the device. If the device is in a default locked status, the method 700 may include completely unlocking all aspects of the device to allow authorized personnel to troubleshoot, update, or otherwise service the device. If the device is a control panel and is in a takeover locked status, to resume use of the automation system, the control panel may require unlocking. Unlocking the control panel to a default locked status may comprise the control panel recognizing one or more unique identifiers on an external device connected to the control panel.

To unlock any aspect of the control panel, the unique identifier, which was transmitted to a remote location in step 710, may be downloaded to an external storage device which may connect to the control panel. When connected, the external storage device may push the unique identifier to the control panel. In another embodiment, the control panel may detect the unique identifier on the external device and the control pane itself may input the unique identifier to unlock the control panel. Once the control panel is unlocked to the desired status, personnel may troubleshoot one or more issues with the control panel. Additionally, unlocking the control panel may enable the user to resume the use of the automation system.

The operation(s) at block 720 may be performed using the unlock module 310 described with reference to FIG. 3.

Thus, the method 700 may provide for a proactive way to react to one or more security events relating to a control panel associated with an automation/security system. It should be noted that the method 700 is just one implementation and that the operations of the method 700 may be rearranged or otherwise modified such that other implementations are possible.

Figure 8:
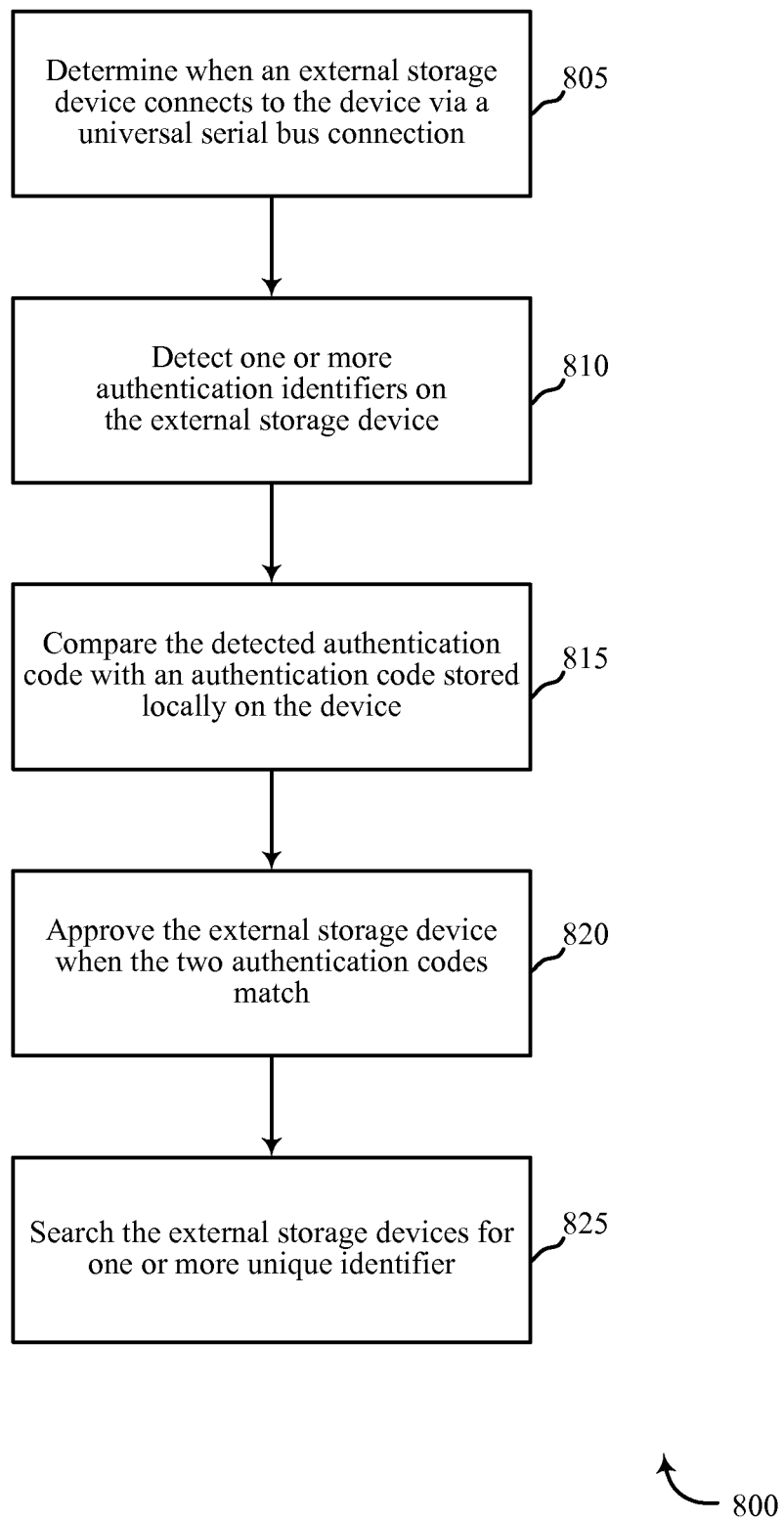
FIG. 8 is a flow chart illustrating an example of a method relating to a security and/or an automation system, in accordance with various aspects of this disclosure.

FIG. 8 is a flow chart illustrating an example of a method 800 for responding to one or more security events at the control panel, in accordance with various aspects of the present disclosure. For clarity, the method 800 is described below with reference to aspects of one or more of the security module 215 described with reference to FIGS. 2, 3, 4, 5 and/or aspects of one or more of the control panel 205 described with reference to FIGS. 1-6. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 805, the method 800 may include determining when an external storage device connects to the device via a universal serial bus (USB) connection. For example, the device may comprise a control panel and the control panel may have one or more female USB drives. When an external storage device comprises a mating male USB drive, plugging the male USB drive into the female counterpart may close one or more electrical circuits. The control panel may recognize when the circuit is closed and detect the presence of the external storage device.

At block 810, the method 800 may include detecting one or more authentication identifiers on the external storage device. Once the control panel has detected the connection with the external storage device, the control panel may search the external storage device for one or more authentication codes. The authentication code may be a code generated by an automation system provider and provided to multiple devices associated with the automation system to verify the devices are validated by the automation system provider and not an unauthorized personnel.

At block 815, the method 800 may comprise comparing the detected authentication code with an authentication code stored locally on the device. After the control panel has determined the authentication code, the control panel may compare the authentication code to the authentication code stored on the control panel. At block 820, the method 800 may include approving the external storage device when the two authentication codes match. Approving the external storage device may comprise allowing the external storage device to access one or more functions of the control panel and vice versa. For example, at bock 825, the method may include searching the external storage device for one or more unique identifiers. The unique identifiers may comprise one or more unique identifiers generated by the control panel and stored externally from the control panel. The unique identifier may unlock the control panel.

The operation(s) at blocks 805-825 may be performed using the unlock module 310 described with reference to FIG. 3.

Thus, the method 800 may provide for a proactive way to react to one or more security events relating to a control panel associated with an automation/security system. It should be noted that the method 800 is just one implementation and that the operations of the method 800 may be rearranged or otherwise modified such that other implementations are possible.

Figure 9:
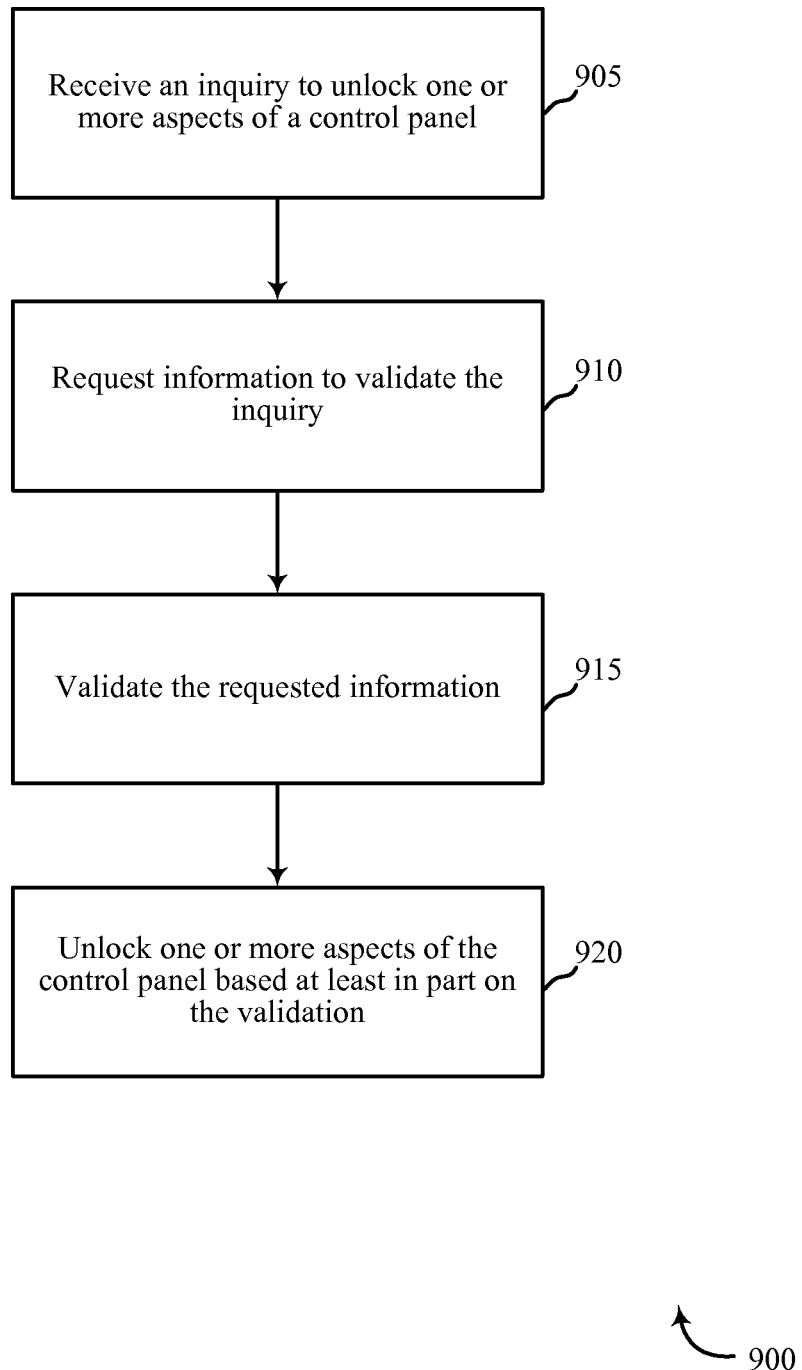
FIG. 9 is a flow chart illustrating an example of a method relating to a security and/or an automation system, in accordance with various aspects of this disclosure.

FIG. 9 is a flow chart illustrating an example of a method 900 for responding to one or more security events at the control panel, in accordance with various aspects of the present disclosure. For clarity, the method 900 is described below with reference to aspects of one or more of the security module 215 described with reference to FIGS. 2, 3, 4, 5 and/or aspects of one or more of the control panel 205 described with reference to FIGS. 1-6. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 905, the method 900 may include receiving an inquiry to unlock one or more aspects of the control panel. The inquiry may be input at the control panel and may be triggered by a technician associated with an automation system provider. The inquiry may comprise an inquiry to unlock the entirety of the control panel to perform any necessary maintenance or other work orders, or may comprise unlocking portions of the control panel. The inquiry may include a request for maintenance or updating the control panel.

At block 910, the method 900 may include requesting information to validate the inquiry. The information may depend at least in part on a status of the control panel. For example, if the control panel is online and connected to the automation system, the request may be automated and may comprise requesting a technician to input an employee identification number for confirmation. However, if the control panel is offline, the request may comprise presenting a challenge question to the technician which may require a validating response.

At block 915, the method 900 may include validating the requested information. Validating the requested information may depend at least in part on the requested information and the status of the control panel. If the requested information comprises an employee identification number, the method 900 may include confirming the employee identification number is associated with a valid employee. Additionally, profile or access parameters associated with the employee identification number may additionally be validated. For example, a control panel may communicate an employee ID to a server and request validating information form the server. The server may confirm the employee associated with the employee ID has permission to access and service the control panel.

In some embodiments, the control panel may additionally be validated. For example, the employee may have a work log with specific control panels listed to service. The method 900 may validate that the employee has a valid employee number and permissions to unlock the requested aspects of the control panel and that the specific control panel is on the approved list for the technician. If employee is not validated and/or not authorized to service the control panel, the method 900 may prompt the user as such and may request additional authorizing information to validate the request. The additional authorizing information may comprise entering in a work order number, a customer complaint number, an employee name, and the like. The method 900 may transfer this information back to the server to validate the information and approve the request.

If, at block 910, a challenge question was presented, at block 915, validating the requested information may comprise comparing the validated information to locally stored information. If the information at least substantially is equivalent, the request may be considered validated. For example, if the response is an exact match, the inquiry may be validated. Additionally, the response may not need specific punctuation to be accepted or may not be caps specific. The response may additionally comprise a numeric code or a visual code such as QR code. The employee may enter in a numeric number to unlock the control panel or may scan a visual code to the unlock the control panel. The code may be specific to the control and may be provided to the employee from the server. For example, the employee may contact a server or other personnel associated with the control panel to retrieve the challenge answer. The challenge answer may be visually sent to a device associated with the employee or may be dictated or otherwise transferred to the employee.

At block 920, the method 900 may include unlocking one or more aspects of the control panel based at least in part on the validation. The one or more aspects may unlock the control panel allowing a user to access the control panel and control one or more portions of an automation and/or security system. Once the control panel is unlocked, the control panel may record the actions taken to alter the automation system. This may include adding/removing sensors, updating software, altering programming for devices, and the like.

The operation(s) at blocks 905-920 may be performed using the verification module 410 and/or the offline module 415 described with reference to FIG. 4.

Thus, the method 900 may provide for a proactive way to react to one or more security events relating to a control panel associated with an automation/security system. It should be noted that the method 900 is just one implementation and that the operations of the method 900 may be rearranged or otherwise modified such that other implementations are possible.

In some examples, aspects from two or more of the methods 700, 800, 900 may be combined and/or separated. It should be noted that the methods 700, 800, 900 are just example implementations, and that the operations of the methods 700, 800, 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method, comprising:
generating, by a wall-mounted control panel of a security and automation system of a structure at a first location, a first unique identifier for the wall-mounted control panel based at least in part on detecting a first biometric identifier of a user at the wall-mounted control panel, the wall-mounted control panel being positioned in the structure of the security and automation system;
transmitting, by the wall-mounted control panel, the first biometric identifier to a server at a second location remote from the first location of the wall-mounted control panel;
entering a locked state when the wall-mounted control panel is reformatted by altering the software or hardware of the wall-mounted control panel;
locking the wall-mounted control panel according to a first lock mode in response to an unauthorized takeover and based at least in part on entering the locked state, the first lock mode being different from a second lock mode of the wall-mounted control panel, wherein the first lock mode prevents a user from accessing the security and automation system and/or the wall-mounted control panel and the second lock mode allows a user to access at least a portion of the security and automation system and/or the wall-mounted control panel upon entering credentials;
detecting an authentication code on an external storage device;
comparing the detected authentication code with an authentication code stored locally on the wall-mounted control panel;
approving the external storage device when the two authentication codes match;
receiving a second unique identifier associated with the wall-mounted control panel from the external storage device using a universal serial bus (USB) drive of the wall-mounted control panel and based at least in part on a second biometric identifier after locking the wall-mounted control panel according to the first lock mode, the second unique identifier being an authenticated version of the first unique identifier that is authenticated by the server;

transitioning from the first lock mode to the second lock mode based at least in part on the wall-mounted control panel validating the second unique identifier, wherein validating the second unique identifier comprises determining, at the wall-mounted control panel, that the first unique identifier, stored locally on the wall-mounted control panel, and the second unique identifier, received from the external storage device, match;

unlocking the wall-mounted control panel from the first lock mode based at least in part on transitioning from the first lock mode to the second lock mode; and opening a profile associated with the second biometric identifier after unlocking the wall-mounted control panel, wherein the second lock mode is based at least in part on the profile associated with the second biometric identifier, wherein the profile comprises a user profile and unlocking the wall-mounted control panel enables the user to access a portion of the security and automation system using the wall-mounted control panel.

2. The method of claim 1, further comprising:
determining when the external storage device connects to the wall-mounted control panel via a universal serial bus connection;
authenticating the external storage device using one or more authentication codes; and
searching the external storage device for the second unique identifier, wherein receiving the second unique identifier is based at least in part on searching the external storage device.

3. The method of claim 2, wherein the profile comprises a provider profile to troubleshoot a problem with the wall-mounted control panel.

4. The method of claim 1, further comprising:
alerting an automation system provider of the locking when the wall-mounted control panel is completely inaccessible.

5. The method of claim 1, further comprising:
resetting the first unique identifier at a predetermined time period.

6. The method of claim 1, further comprising:
expiring the first unique identifier after a predetermined time period.

7. The method of claim 1, wherein generating the first biometric identifier further comprises:
detecting, at the wall-mounted control panel when the wall-mounted control panel is installed, one or more of a voice or fingerprint of the user.

8. A device, comprising:
a wall-mounted control panel of a security and automation system, the wall-mounted control panel being positioned in a structure at a first location associated with the security and automation system, the wall-mounted control panel including a processor, memory in electronic communication with the processor; and
instructions stored in the memory, the instructions being executable by the processor to:
generate, by the wall-mounted control panel of the security and automation system of the structure at the first location, a first unique identifier for the wall-mounted control panel based at least in part on detecting a first biometric identifier of a user at the wall-mounted control panel;

transmit, by the wall-mounted control panel, the first biometric identifier to a server at a second location remote from the first location of the wall-mounted control panel;

enter a locked state when the wall-mounted control panel is reformatted by altering the software or hardware of the wall-mounted control panel;

lock the wall-mounted control panel according to a first lock mode in response to an unauthorized takeover and based at least in part on entering the locked state, the first lock mode being different from a second lock mode of the wall-mounted control panel, wherein the first lock mode prevents a user from accessing the security and automation system and/or the wall-mounted control panel and the second lock mode allows a user to access at least a portion of the security and automation system and/or the wall-mounted control panel upon entering credentials;

detect an authentication code on an external storage device;

compare the detected authentication code with an authentication code stored locally on the wall-mounted control panel;

approve the external storage device when the two authentication codes match;

receive a second unique identifier associated with the wall-mounted control panel from the external storage device using a universal serial bus (USB) drive of the wall-mounted control panel and based at least in part on a second biometric identifier after locking the wall-mounted control panel according to the first lock mode, the second unique identifier being an authenticated version of the first unique identifier that is authenticated by the server;

transition from the first lock mode to the second lock mode based at least in part on the wall-mounted control panel validating the second unique identifier, wherein validating the second unique identifier comprises determining, at the wall-mounted control panel, that the first unique identifier, stored locally on the wall-mounted control panel, and the second unique identifier, received from the external storage device, match;

unlock the wall-mounted control panel from the first lock mode based at least in part on transitioning from the first lock mode to the second lock mode; and open a profile associated with the second biometric identifier after unlocking the wall-mounted control panel, wherein the second lock mode is based at least in part on the profile associated with the second biometric identifier, wherein the profile comprises a user profile and unlocking the wall-mounted control panel enables the user to access a portion of the security and automation system using the wall-mounted control panel.

9. The device of claim 8, wherein the instructions are further executable by the processor to:
determine when the external storage device connects to the device via a universal serial bus connection;
authenticate the external storage device using an authentication code;
search the external storage device for the second unique identifier, wherein receiving the second unique identifier is based at least in part on searching the external storage device.

10. The device of claim 8, wherein the instructions are further executable by the processor to:
alert an automation system provider of the locking when the device is completely inaccessible.

11. A non-transitory computer-readable medium storing computer-executable code for security and automation systems, the code executable by a processor to:
generate, by a wall-mounted control panel of a security and automation system of a structure at a first location, a first unique identifier for the wall-mounted control panel based at least in part on detecting a first biometric identifier of a user at the wall-mounted control panel, the wall-mounted control panel being positioned in the structure of the security and automation system;
transmit, by the wall-mounted control panel, the first biometric identifier to a server at a second location remote from the first location of the wall-mounted control panel;
enter a locked state when the wall-mounted control panel is reformatted by altering the software or hardware of the wall-mounted control panel;
lock the wall-mounted control panel according to a first lock mode in response to an unauthorized takeover and based at least in part on entering the locked state, the first lock mode being different from a second lock mode of the wall-mounted control panel, wherein the first lock mode prevents a user from accessing the security and automation system and/or the wall-mounted control panel and the second lock mode allows a user to access at least a portion of the security and automation system and/or the wall-mounted control panel upon entering credentials;
detect an authentication code on an external storage device;
compare the detected authentication code with an authentication code stored locally on the wall-mounted control panel;
approve the external storage device when the two authentication codes match;
receive a second unique identifier associated with the wall-mounted control panel from the external storage device using a universal serial bus (USB) drive of the wall-mounted control panel and based at least in part on a second biometric identifier after locking the wall-mounted control panel according to the first lock mode, the second unique identifier being an authenticated version of the first unique identifier that is authenticated by the server;
transition from the first lock mode to the second lock mode based at least in part on the wall-mounted control panel validating the second unique identifier, wherein validating the second unique identifier comprises determining, at the wall-mounted control panel, that the first unique identifier, stored locally on the wall-mounted control panel, and the second unique identifier, received from the external storage device, match;
unlock the wall-mounted control panel from the first lock mode based at least in part on transitioning from the first lock mode to the second lock mode; and
open a profile associated with the second biometric identifier after unlocking the wall-mounted control panel, wherein the second lock mode is based at least in part on the profile associated with the second biometric identifier, wherein the profile comprises a user profile and unlocking the wall-mounted control panel enables the user to access a portion of the security and automation system using the wall-mounted control panel.

12. The non-transitory computer-readable medium of claim 11, the code further executable by the processor to:
determine when the external storage device connects to the wall-mounted control panel via a universal serial bus connection;
authenticate the external storage device using an authentication code;
search the external storage device for the second unique identifier, wherein receiving the second unique identifier is based at least in part on searching the external storage device.

13. The non-transitory computer-readable medium of claim 11, the code further executable by the processor to:
alert an automation system provider of the locking when the wall-mounted control panel is completely inaccessible.

* * * * *